(12) United States Patent
Ip et al.

(10) Patent No.: US 12,135,234 B2
(45) Date of Patent: Nov. 5, 2024

(54) FREQUENCY-DRIFT COMPENSATION IN CHIRPED-PULSE-BASED DISTRIBUTED ACOUSTIC SENSING

(71) Applicant: NEC Laboratories America, Inc., Princeton, NJ (US)

(72) Inventors: Ezra Ip, West Windsor, NJ (US); Yue-Kai Huang, Princeton, NJ (US)

(73) Assignee: NEC Corporation, Tokyo (JP)

( * ) Notice: Subject to any disclaimer, the term of this patent is extended or adjusted under 35 U.S.C. 154(b) by 226 days.

(21) Appl. No.: 17/967,812

(22) Filed: Oct. 17, 2022

(65) Prior Publication Data

US 2023/0146473 A1    May 11, 2023

Related U.S. Application Data

(60) Provisional application No. 63/270,199, filed on Oct. 21, 2021.

(51) Int. Cl.
| | |
|---|---|
| *G01H 9/00* | (2006.01) |
| *G01D 5/26* | (2006.01) |
| *G01D 5/353* | (2006.01) |
| *H04L 27/227* | (2006.01) |

(52) U.S. Cl.
CPC ............. *G01H 9/004* (2013.01); *G01D 5/268* (2013.01); *G01D 5/35361* (2013.01); *H04L 27/2278* (2013.01)

(58) Field of Classification Search
CPC .... G01H 9/004; G01D 5/268; G01D 5/35361; H04L 27/2278
See application file for complete search history.

(56) References Cited

U.S. PATENT DOCUMENTS 11,287,352 B2 *   3/2022   Rapp .................. G01M 11/3145

* cited by examiner

*Primary Examiner* — John Bedtelyon
(74) *Attorney, Agent, or Firm* — Joseph Kolodka (57) ABSTRACT

Aspects of the present disclosure directed to frequency drift compensation for coded-DAS systems that use chirped pulses as a probe signal. Our inventive approach estimates timing jitter by correlating the amplitude of the estimated Rayleigh impulse response of every frame with a reference frame, and then re-aligns each frame by the estimated timing jitter. As the amount of timing jitter varies within a frame, every frame is divided into blocks where all samples have similar timing jitter, and perform timing jitter estimation and compensation on a block-by-block, frame-by-frame basis using an overlap-and-save method. Tracking of a slowly changing channel is enabled by allowing the reference frame to be periodically updated.

6 Claims, 7 Drawing Sheets

FREQUENCY-DRIFT COMPENSATION IN CHIRPED-PULSE-BASED DISTRIBUTED ACOUSTIC SENSING

CROSS REFERENCE

This application claims the benefit of U.S. Provisional Patent Application Ser. No. 63/270,199 filed 21 Oct. 2021, the entire contents of which being incorporated by reference as if set forth at length herein.

TECHNICAL FIELD

This disclosure relates generally to distributed fiber optic sensing (DFOS) systems, methods, and structures and, in particular, to frequency-drift compensation in chirped-pulse-based distributed acoustic sensing (DAS).

BACKGROUND

Recently, DFOS systems and methods have been employed to provide superior acoustic and/or vibrational monitoring of roadways, bridges, and buildings. The reliability, robustness, and sensitivity of such systems is generally known to be unmatched by existing, legacy systems and methods. Given such characteristics, further improvement of DFOS/DAS techniques-coupled with novel analysis systems and methods would represent a welcome addition to the art.

SUMMARY

An advance in the art is made according to aspects of the present disclosure directed to frequency drift compensation for coded-DAS systems that use chirped pulses as a probe signal.

Frequency drift results in timing jitter in the estimated Rayleigh impulse response, which is obtained by correlating the received Rayleigh backscatter with the originating chirp. Since in any given received frame, neighboring samples will have similar timing jitter, this effect can be compensated by dividing each frame into small blocks where all samples are shifted by the same timing jitter, correlating the amplitude profile from frame to frame, and then re-aligning them in time.

Our inventive approach provides an architecture for estimating and correcting timing jitter using an overlap-and-save architecture with low algorithmic complexity and enables coded-DAS systems to employ using "cheaper" lasers with larger frequency drift by using DSP to compensate for the hardware.

Viewed from one aspect, our inventive approach estimates timing jitter by correlating the amplitude of the estimated Rayleigh impulse response of every frame with a reference frame, and then re-aligns each frame by the estimated timing jitter. As the amount of timing jitter varies within a frame, every frame is divided into blocks where all samples have similar timing jitter, and perform timing jitter estimation and compensation on a block-by-block, frame-by-frame basis using an overlap-and-save method. Tracking of a slowly changing channel is enabled by allowing the reference frame to be periodically updated.

Viewed from a first aspect, the present disclosure describes DFOS systems, methods, and structures for monitoring outdoor cabinets containing fiber optic facilities in which the cabinet/fiber optic cable contained therein are configured to provide superior acoustic sensing.

Viewed from a second aspect, the present disclosure describes DFOS systems, methods, and structures for monitoring manhole structures.

Finally, viewed from yet another aspect, the present disclosure describes DFOS systems, methods, and structures employing a machine learning-based analysis method that employs a temporal relation network.

BRIEF DESCRIPTION OF THE DRAWING

A more complete understanding of the present disclosure may be realized by reference to the accompanying drawing in which:

FIG. 2(A) and FIG. 2(B) are a pair of plots illustrating the impact of frequency shift on the correlation of a chirped pulse for: FIG. 2(A) no frequency shift, and FIG. 2(B) 4 MHz frequency shift according to aspects of the present disclosure;

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we begin by noting that distributed fiber optic sensing (DFOS) is an important and widely used technology to detect environmental conditions (such as temperature, vibration, acoustic excitation vibration, stretch level etc.) anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. DFOS can also employ a signal of forward direction that uses speed differences of multiple modes. Without losing generality, the following description assumes reflected signal though the same approaches can be applied to forwarded signal as well.

Figure 1A:
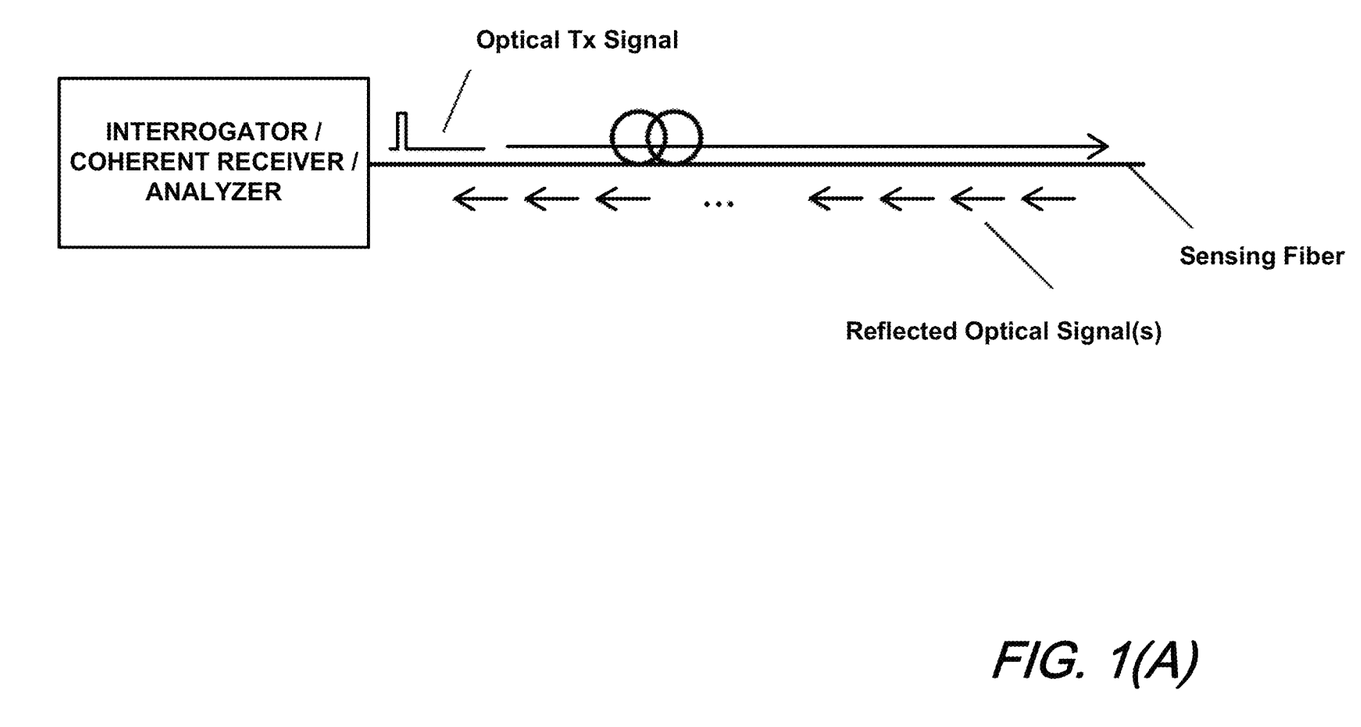
FIG. 1(A) is a schematic diagram illustrating a DFOS system according to aspects of the present disclosure.

FIG. 1(A) is a schematic diagram of a generalized, prior-art DFOS system. As will be appreciated, a contemporary DFOS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as a power level change that indicates—for example—a mechanical vibration. While not shown in detail, the interrogator may include a coded DFOS system that may employ a coherent receiver arrangement known in the art such as that illustrated in FIG. 1(B).

The reflected signal is converted to electrical domain and processed inside the interrogator. Based on the pulse injection time and the time signal is detected, the interrogator determines at which location along the fiber the signal is coming from, thus able to sense the activity of each location along the fiber.

Those skilled in the art will understand and appreciate that by implementing a signal coding on the interrogation signal enables the sending of more optical power into the fiber which can advantageously improve signal-to-noise ratio (SNR) of Rayleigh-scattering based system (e.g. distributed acoustic sensing or DAS) and Brillouin-scattering based system (e.g. Brillouin optical time domain reflectometry or BOTDR).

Operationally, we assume that the DFOS system will be Rayleigh-scattering based system (e.g., distributed acoustic sensing or DAS) and Brillouin-scattering based system (e.g., Brillouin optical time domain reflectometry or BOTDR) with a coding implementation. With such coding designs, these systems will be most likely be integrated with fiber communication systems due to their lower power operation and will also be more affected by the optical amplifier response time.

Figure 1B:
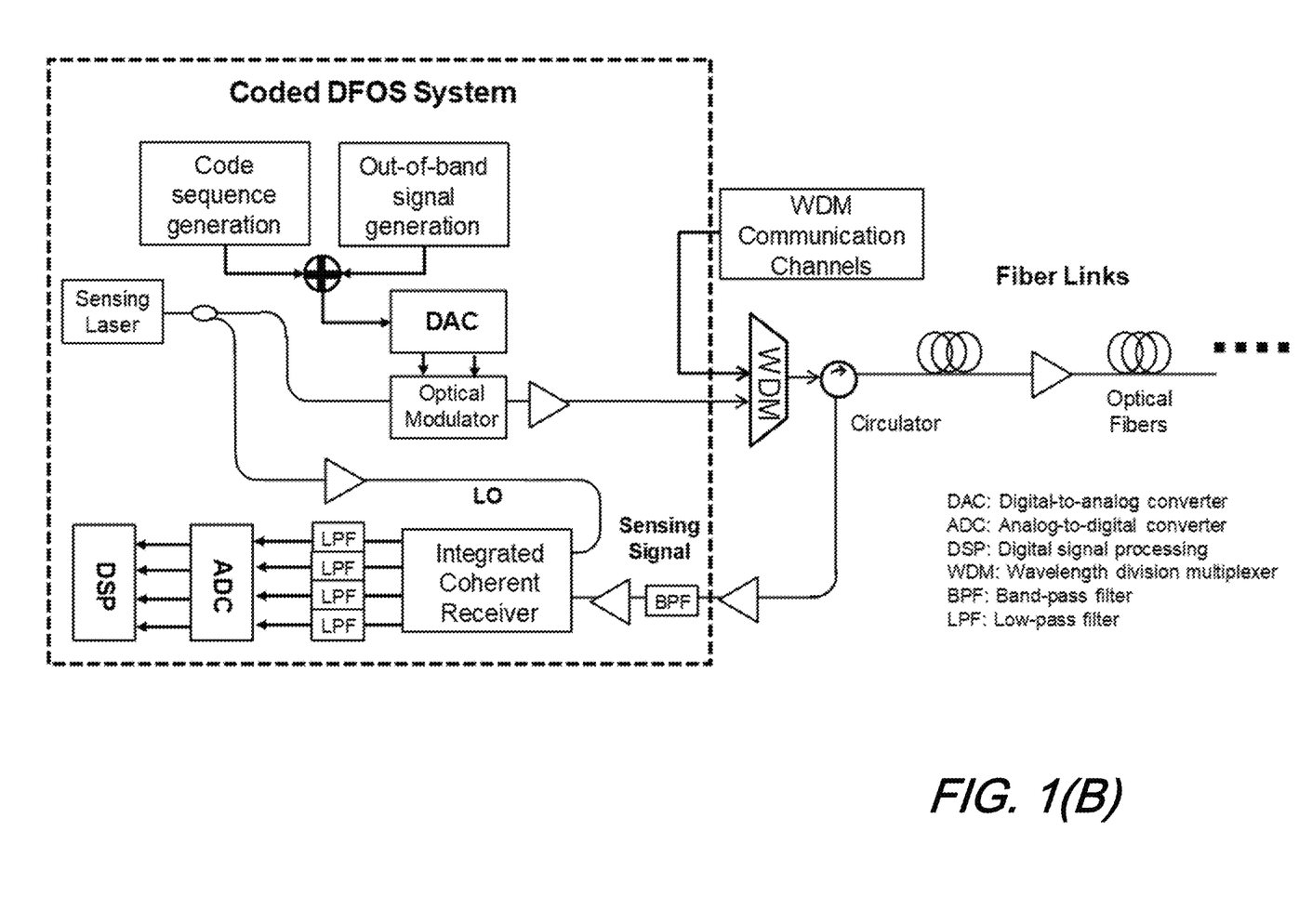
FIG. 1(B) is a schematic diagram illustrating a coded constant-amplitude DFOS system with out-of-band signal generation according to aspects of the present disclosure.

In the arrangement illustratively shown in the block diagram, we assume that the coded interrogation sequence is generated digitally and modulated onto the sensing laser via digital-to-analog-conversion (DAC) and an optical modulator. The modulated interrogation sequence may be amplified to optimal operation power before being directed into the fiber for interrogation.

Advantageously, the DFOS operation may also be integrated together with communication channels via WDM in the same fiber. Inside the sensing fiber, the interrogation sequence and the returned sensing signal may be optically amplified-either via discrete (EDFA/SOA) or distributed (Raman) methods. A returned sensing signal is routed to a coherent receiver after amplification and optical band-pass filtering. The coherent receiver detects the optical fields in both polarizations of the signal, down-converting them to 4 baseband lanes for analog-to-digital conversion (ADC) sampling and digital signal processor (DSP) processing. As those skilled in the art will readily understand and appreciate, the decoding operation is done in the DSP to generate the interrogated Rayleigh or Brillouin response of the fiber, and any changes in the response are then identified and interpreted for sensor readouts.

With continued reference to the figure, since the coded interrogation sequence is generated digitally, the out-of-band signal is also generated digitally, and then combined with the code sequence before waveforms are created by the DAC. When generated together digitally, the out-of-band signal will only be generated outside the time period of the code sequence, so when added together, the combined waveform will have a constant amplitude.

In distributed acoustic sensing (DAS), the interrogator launches a probe signal x(t) into the fiber under test (FUT) to estimate its Rayleigh impulse response h(t). The received signal is given by the convolution y(t)=x(t)⊗h(t). Conventionally, $x(t)=\sqrt{P}\text{rect}(t/T)$ is a pulse with peak power P and duration T.

In order to measure time-variation in the Rayleigh impulse response caused by acoustic vibration, the interrogator transmits x(t) periodically at a frame rate of $T_p$. Provided $T_p$ is longer than the round-trip propagation time $T_{rt}$ of the FUT, the received signal is a sequence of optical time-domain reflectometry (OTDR) traces.

The spatial resolution of y(t) is $z_{res}=(c/2n_{\it eff})T$ and is controlled by the bandwidth of x(t). By measuring the phase relationship between pairs of points at positions $z_1=(c/2n_{\it eff})t_1$ and $z_2=(c/2n_{\it eff})t_2$ in the received OTDR, and how that phase varies with time, the time-varying longitudinal strain between $z_1$ and $z_2$ can be monitored. This technique of phase-OTDR (ϕ-OTDR) is well known in the art.

Due to the weak power of Rayleigh backscatter, the reach achievable by DAS is limited. Coded-DAS increases the signal-to-noise (SNR) ratio achieved by DAS to allow for longer FUT. Instead of launching pulses—and as previously noted—the probe signal in coded-DAS is a sequence with autocorrelation function $r_{xx}(t)=x(t)*x(t)$ that is as close to a delta function as possible, with its width constrained only by the bandwidth of x(t). The coded-DAS interrogator performs correlation of the received signal with x(t) to obtain $z(t)=x(t)*y(t)=r_{xx}(t)h(t)$.

$$r_{xx}(0) = \int_{-\infty}^{+\infty} |x(t)|^2 dt = P \cdot T_c$$

is the energy of x(t), the longer the sequence, the larger the received signal. Advantageously, SNR can be increased linearly with $T_c$ without sacrificing spatial resolution. Laser phase noise is the limiting factor for how large $T_c$ can be.

One well-known family of sequences with good autocorrelation properties are chirped pulses:

$$x(t) = \sqrt{P} \exp\left(j2\pi\alpha\frac{t^2}{2}\right)\text{rect}\left(\frac{t}{T_c}\right) \quad (1)$$

where $T_c$ is the chirp duration, α is the chirp rate, and $\sqrt{P}$ is the amplitude of the envelope. The bandwidth of the x(t) is $B=\alpha T_c$, and its autocorrelation is given by:

$$R_{xx}(t)=x(t)*x(t)=(T_c-|t|)\sin c(\alpha t(T_c-|t|)), \quad (2)$$

For long chirp duration $T_c \gg T$, the width of the main lobe of the sin c in Eq. (2) is $T=1/\alpha T_c=1/B$, which is the same spatial resolution as a rectangular pulse of the same bandwidth used in conventional OTDR.

Chirped pulses have the special property that the correlation function between two chirped pulses $x_1(t)$ and $x_2(t)$ is only the sin c function in Eq. (2) if their chirp rates $\alpha_1$ and $\alpha_2$ match. If this is the case, their correlation peak occurs where their center frequency match.

Figure 2A:
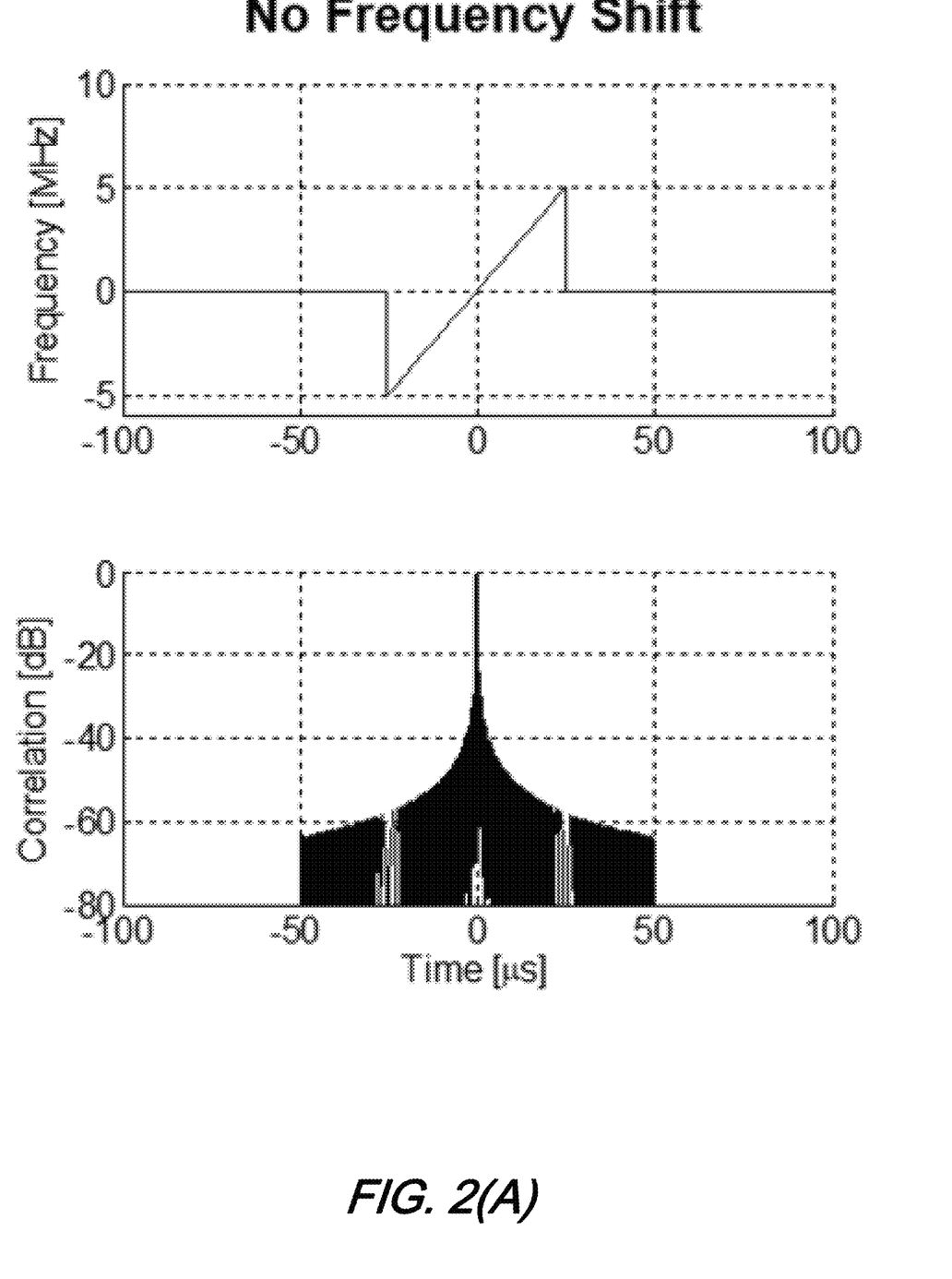
Figure 2B:
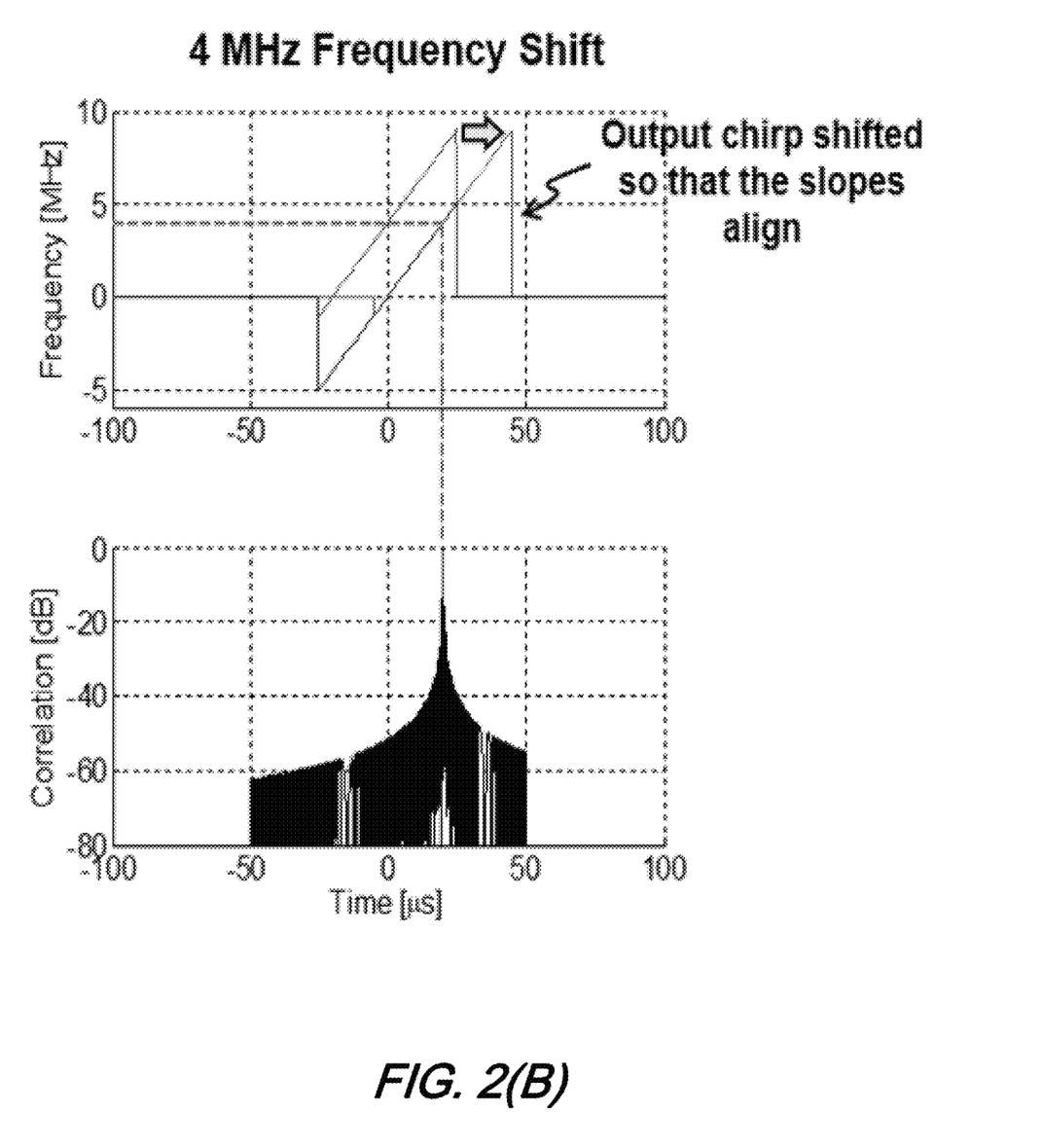

FIG. 2(A) and FIG. 2(B) are a pair of plots illustrating the impact of frequency shift on the correlation of a chirped pulse for: FIG. 2(A) no frequency shift, and FIG. 2(B) 4 MHz frequency shift according to aspects of the present disclosure. Chirps have the special property that a correlation peak is produced when their instantaneous frequencies align. Frequency modulation of one chirped pulse thus results in a temporal shift of the correlation peak (and also a slight broadening of the main lobe of the correlation function due to reduced bandwidth overlap).

An example is shown in FIG. 2(A) and FIG. 2(B) where a chirped pulse of duration $T_c=50$ μs and bandwidth $B=10$ MHZ ($\alpha=2\times10^{11}$ s$^{-2}$) is correlated with the same chirped pulse that is frequency-shifted by $\Delta v=4$ MHZ. It is observed that their correlation $x_2(t)*x_1(t)$ is centered at an offset of $\Delta\tau=\Delta v/\alpha=20$ μs. In addition, the width of the correlation is inversely proportional to their bandwidth overlap, which in the example shown is 6 MHz.

This property of chirped pulses, where frequency modulation results in temporal shift of the center of the correlation function is important to coded-DAS based on chirped pulses.

Figure 3:
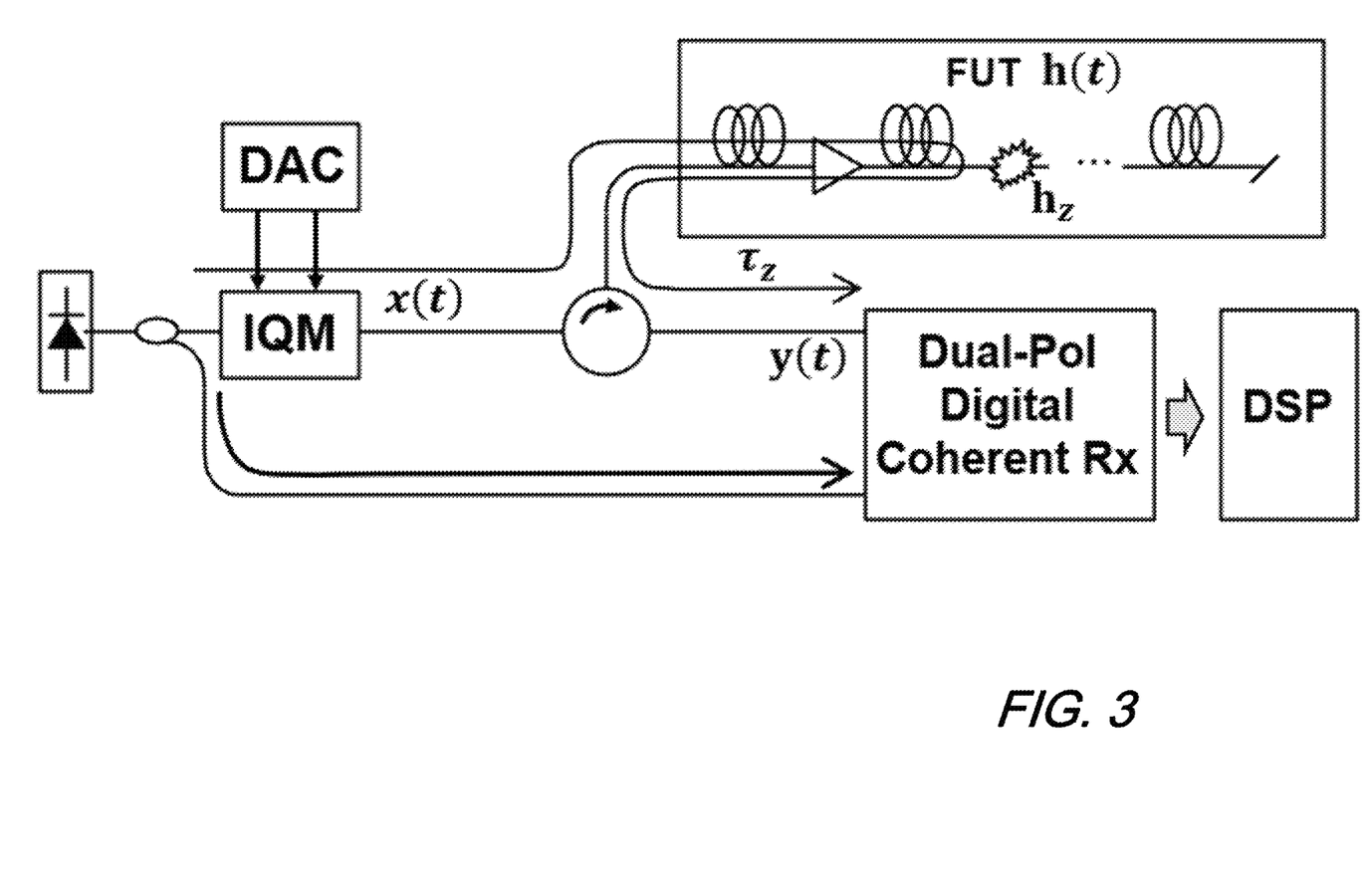
FIG. 3 is a schematic diagram illustrating a canonical model of a coded-DAS interrogator where the same laser is used to generate probe signal x(t) and to serve as local oscillator for coherent detection of the Rayleigh backscatter y(t) of the fiber under test (FUT) with Rayleigh impulse response h(t) according to aspects of the present disclosure.

FIG. 3 is a schematic diagram illustrating a canonical model of a coded-DAS interrogator where the same laser is used to generate probe signal x(t) and to serve as local oscillator for coherent detection of the Rayleigh backscatter y(t) of the fiber under test (FUT) with Rayleigh impulse response h(t) according to aspects of the present disclosure.

Consider the canonical model of a DAS system shown in FIG. 3, where the same laser is used to generate the probe signal and to serve as local oscillator (LO) for coherent detection of the Rayleigh backscatter. Consider the reflection from the point shown in the FUT in FIG. 3. Since there is a propagation delay difference of $\tau_z=(2n_{eff}/c)z$ between the reflected signal and the LO, the laser frequency will have drifted over duration $\tau_z$. Frequency drift is the manifestation of laser phase noise in the low frequency region and is caused by factors such as temperature fluctuation and mechanical vibration, etc., which causes fluctuation in the optical length of the laser cavity, thus impacting the laser's center frequency.

As per FIG. 2(A), and FIG. 2(B), the impact of frequency drift is uncertainty in time (or position) of the Rayleigh impulse response. Normally, the fiber position z is mapped to time coordinate $t=(2n_{eff}/c)z$ in the Rayleigh impulse response h(t). But due to laser frequency drift, the actual fiber position at time t is $\bar{z}+\delta z$ where $\bar{z}=(c/2n_{eff})t$ is the mean position, and $\delta z$ is a variable that changes from frame to frame, depending on the laser frequency drift $\Delta v$ during that frame. When DAS computes a φ-OTDR based on the differential product between two points separated by gauge length $z_g$, instead of monitoring the phase difference between two fixed scatterers at $z_1=\bar{z}-z_g/2$ and $z_2=\bar{z}+z_g/2$, the actual phase difference is computed for two scatterers at $z_1=\bar{z}+\delta z-z_g/2$ and $z_2=\bar{z}+\delta z+z_g/2$. If $\delta z$ is larger than the spatial resolution, the resulting DAS will become non-sensical, since scatters separated by larger than the spatial resolution should be independent.

The impact of laser frequency drift on the performance of DAS is understood in an experiment in which a 50-km long FUT was probed using chirped pulses of duration $T_c=50$ μs and bandwidth $B=10$ MHZ (spatial resolution $z_{res}=c/2n_{eff}B\approx10$ m), at a repetition rate of 1 kHz. At 50 km, a piezo-electric transducer (PZT) was inserted, followed by another 100 m of termination fiber. The PZT was excited with a 67-Hz sine wave with peak-to-peak amplitude of 1.6 rad.

When one employs a specific ("bad") laser, the frequency drift results are so severe that the background noise level is larger than the vibration amplitude of the PZT. With a different ("good") laser however, the 67-Hz sine wave is easily observed.

Although it is possible to build a chirped pulse DAS using the "good" laser, it is more expensive. Since frequency drift only results in linear translation of the time/position axis, and fiber positions close together should experience similar time/position shift as the laser frequency should be stable over short timescales, it should be possible to compensate this time (position) jitter using digital signal processing (DSP), and therefore allow DAS using the "bad" laser with higher phase noise.

Notwithstanding, the present disclosure provides a solution for frequency drift compensation for coded-DAS systems that use chirped pulses as the probe signal. Frequency drift results in timing jitter in the estimated Rayleigh impulse response, which is obtained by correlating the received Rayleigh backscatter with the originating chirp.

Since in any given received frame, neighboring samples will exhibit similar timing jitter, our inventive disclosure compensates for this effect by dividing each frame into small blocks where all samples are shifted by the same timing jitter, correlating the amplitude profile from frame to frame, and then re-aligning them in time. Our disclosed solution provides an architecture for estimating and correcting timing jitter using an overlap-and-save architecture, and also provides preferred implementations with low algorithmic complexity. Our disclosed solution enables coded-DAS using "cheaper" lasers with larger frequency drift by using DSP to compensate the hardware deficiencies.

As will become apparent to those skilled in the art, features of our disclosed solution according to aspects of the present disclosure include: (i) estimation of timing jitter by correlating the amplitude of the estimated Rayleigh impulse response of every frame with a reference frame, and then (ii) re-aligning each frame by the estimated timing jitter.

As the amount of timing jitter varies within a frame, our inventive approach divides every frame into blocks where all samples exhibit a similar timing jitter, and then perform timing jitter estimation and compensation on a block-by-block, frame-by-frame basis using an overlap-and-save method. Our inventive approach also enables tracking of a slowly changing channel by allowing the reference frame to be periodically updated.

Figure 4:
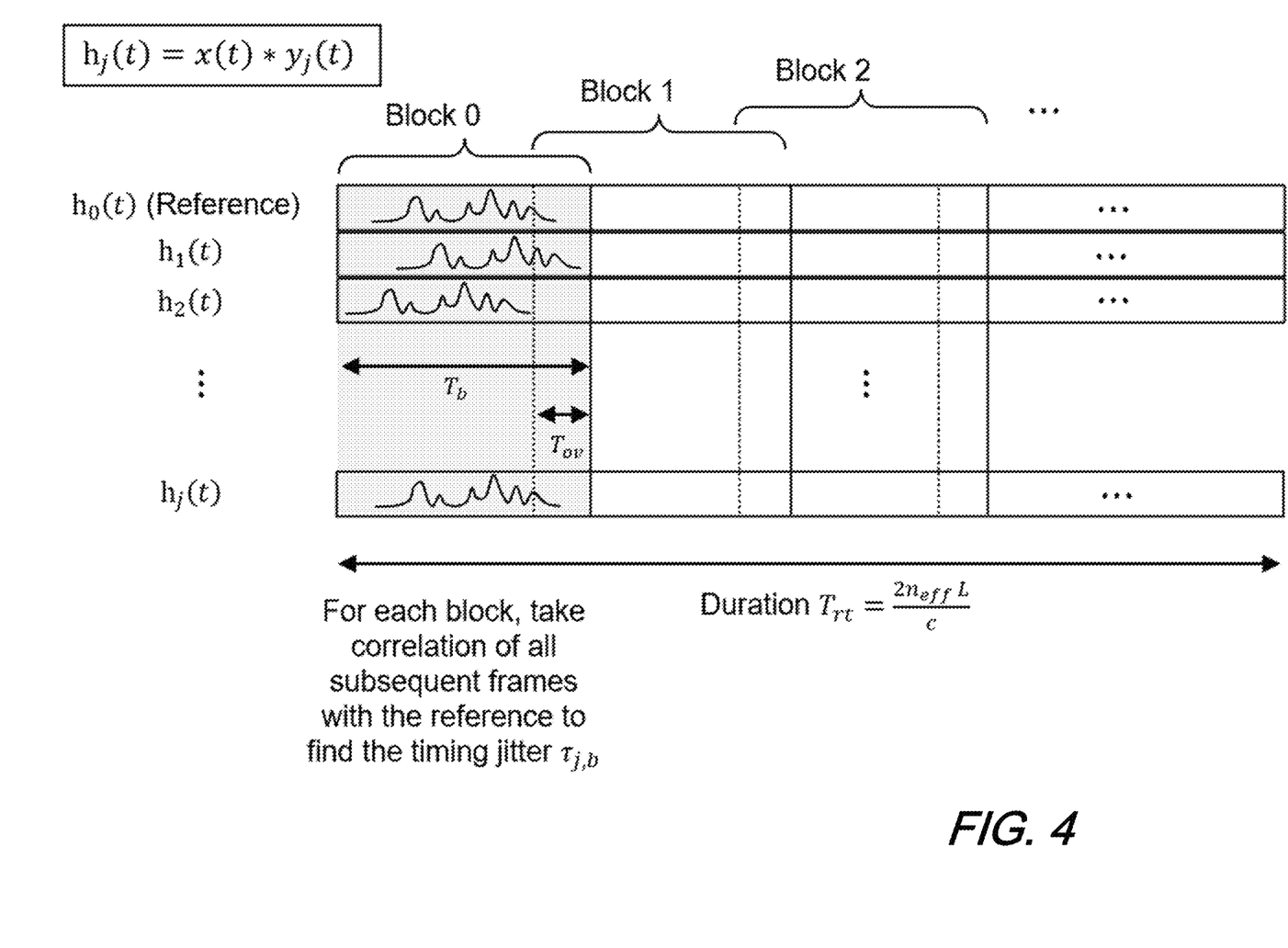
FIG. 4 is a schematic diagram showing illustrative architecture for laser frequency drift compensation in coded-DAS according to aspects of the present disclosure.

FIG. 4 is a schematic diagram showing illustrative architecture for laser frequency drift compensation in coded-DAS according to aspects of the present disclosure. As illustrated, the architecture shown in FIG. 4 is for chirped pulses using an overlap-and-save algorithm. Operationally, after correlating the received signal with the known chirp to obtain $h_j(t)=x(t)*y_j(t)$ in the j-th frame, the time axis is partitioned into Ng overlapping blocks of duration $T_b$ and overlap $T_{ov}$. Taking frame j=0 as reference, the square amplitude of each block $|h_j(t_p)|^2$ in subsequent frames is compared with $|h_0(t_p)|^2$ to find their relative offset $\tau_{j,b}$. Each block is then shifted by $\tau_{j,b}$ to obtain the compensated outputs $\tilde{h}_j(t_b)$. Normal DAS operations are then performed on $\tilde{h}(t)$.

To further clarify, we let $y_j(t)$ be the complex-valued signal vector received due to the probe pulse launched in frame j. Let $h_j(t)=x(t)*y_j(t)$ be the output of the correlator. The duration of each vector is $T_{rt}$ equal to the round-trip return time of the FUT. We divide $h_j(t)$ into overlapping blocks of duration $T_B$ and overlap $T_{ov}$. The number of overlapping blocks Np needs to satisfy $(N_b-1)(T_b-T_{ov})+T_b \geq T_{rt}$. Let ty $\in \{t: b(T_b-T_{ov}) \leq t < b(T_b-T_{ov})+T_b\}$ be the duration of block b, where $0 \leq b < N_b$.

We then take the initial frame $h_0(t)$ to be the reference. For every block b, we correlate the amplitude $|h_j(t_b)|^2$ of all subsequent frames with the reference $|h_0(t_b)|^2$ to estimate the timing jitter $$\tau_{j,b} = \max_\tau \int_{t_b} |h_j(t-\tau)|^2 |h_0(t)|^2 dt$$

during block b of frame j. We then shift $h_j(t_b)$ by $\tau_{j,b}$ to obtain the compensated signal $\tilde{h}_j(t_b)=h_j(t_b-\tau_{j,b})$. The useful part of the overlap-and-save, $b(T_b-T_{ov}) \leq t < (b+1)(T_b-T_{ov})$, is then stored. The frequency-drift compensated signal is $\tilde{h}(t)$.

The downstream operations needed to estimate vibration at every point in the FUT are then the same as conventional DAS. These operations may include calculating differential beat products at a pre-defined gauge length, diversity-combining the beat products from different polarizations, frequencies, and spatial channels, etc., and then finally taking the unwrapped phase at every location in the FUT.

According to our inventive disclosure, the block length $T_b$ should be chosen so that the root mean square (r.m.s.) frequency drift $\sigma_{\Delta v}(T_b)$ over duration $T_b$ is much less than time resolution of the chirp $T=1/B$, i.e., the samples in $h_j(t_b)$ are all delayed relative to $h_0(t)$ by a similar amount down to an accuracy of the time-resolution $1/B$. $T_b$ will depend on the laser used by the interrogator.

Suppose the laser's instantaneous frequency is $v(t)$. Let $S_{vv}(f)$ be the two-sided frequency noise spectrum of is $v(t)$. The frequency drift $\Delta v_{T_b}(t)=v(t)-v(t-T_b)$ between two time instances separated by $T_b$ has the Fourier transform $\Delta v_{T_b}(f)=[1-e^{-j2\pi f T_b}] v(f)$. Hence, the spectrum of $\Delta v_{T_b}(t)$ is $$S_{\Delta v_{T_b} \Delta v_{T_b}}(f) = |1 - e^{-j2\pi f T_b}|^2 S_{vv}(f).$$

It is well known that the variance $E[|\Delta v_{T_b}(t)|^2]$ is equal to the autocorrelation $$R_{\Delta v_{T_b} \Delta v_{T_b}}(\tau) \text{ evaluated at } \tau = 0,$$

which is equal to the integral of $$S_{\Delta v_{T_b} \Delta v_{T_b}}(f)$$

over all frequencies. Hence, $$E[|\Delta v_{T_b}(t)|^2] = \int_{-\infty}^{+\infty} |1 - e^{-j2\pi f T_b}|^2 S_{vv}(f) df.$$

Since $\Delta v_{T_b}(t)$ is a Gaussian process, $T_b$ should be chosen so that $\sigma_{\Delta v}(T_b) = \sqrt{E[|\Delta v_{T_b}|^2]} = 1/fB$, to ensure the probability $\text{erfc}(f/\sqrt{2})$ is small that the samples $T_b$ at the beginning and end of a block have relative timing jitter greater than 1/B.

Similarly, the overlap duration $T_{ov}$ should be larger than twice the maximum value of $|\tau_{j,b}|$ that may need to be compensated. As per FIG. 3, the r.m.s. value of the timing jitter is $\sigma_{\Delta v}(t)/\alpha$, which increases with distance from the interrogator $z=(c/2n_{eff})t$. If a constant overlap size is used, then the overlap duration should be chosen as $$T_{ov} = \kappa \frac{\sigma_{\Delta v}(T_{rt})}{\alpha},$$

to ensure the probability $\text{erfc}(\kappa/\sqrt{2})$ is small that the time jitter $\tau_{j,N_p}$ of the last block of any frame is larger than the overlap duration.

In practice, the Rayleigh impulse response h(t) that is estimated by $h_j(t)$ is slowly changing with time due to polarization rotation, temperature fluctuation, etc. If the reference $h_0(t)$ is held for too long, then eventually, h(t) will have changed so much that $|h_0(t)|^2$ is no longer a good match for the incoming frames. Hence, the reference should be updated regularly every $N_u$ frames. i.e., the $mN_u$-th timing-jitter-compensated frame $\tilde{h}_{mN_u}(t)$ should be used as the new reference for compensating frames $h_{mN_u+1}(t)$ to $h_{(m+1)N_u}(t)$.

Figure 5:
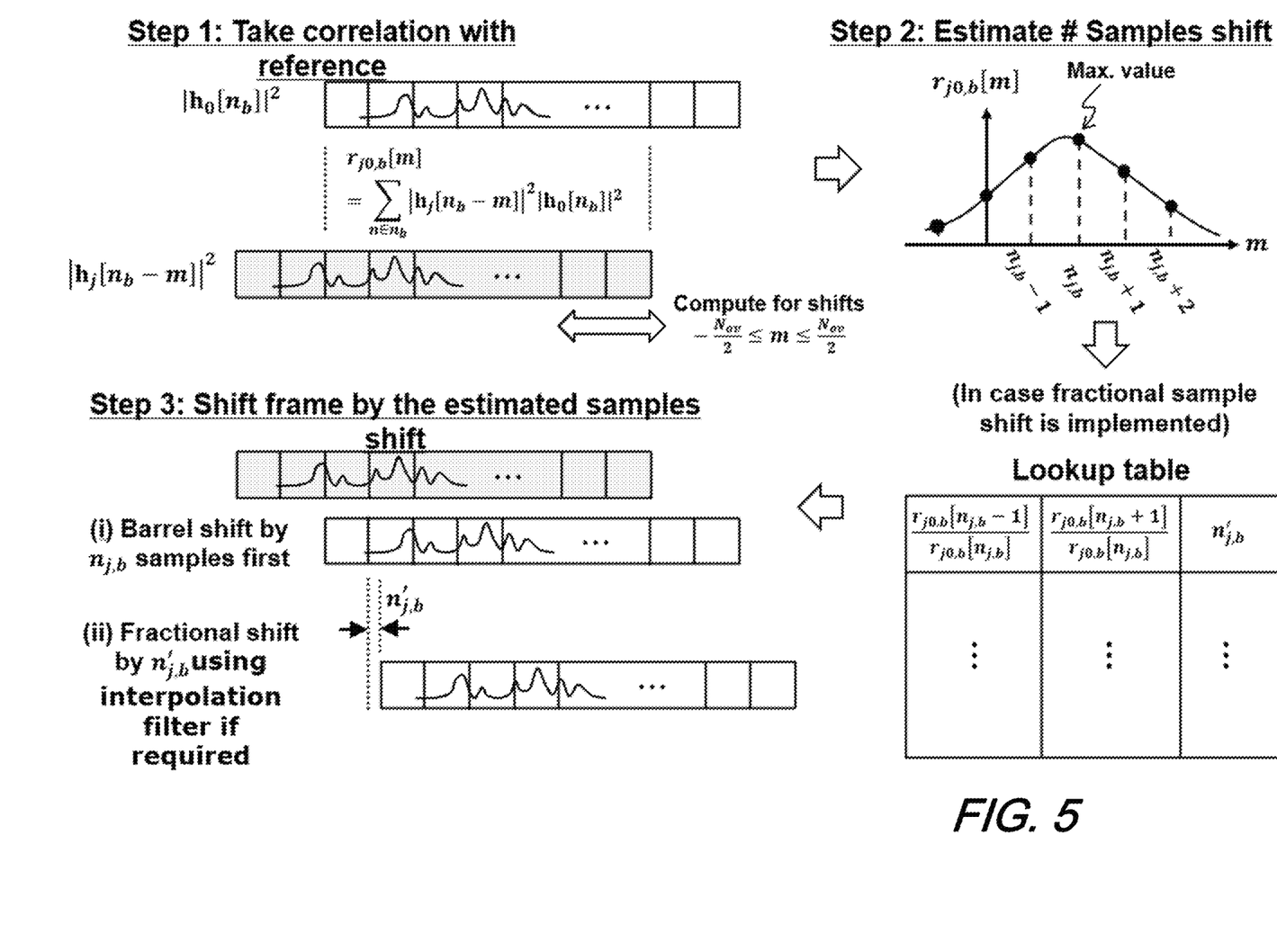
FIG. 5 is a schematic diagram showing illustrative procedure for compensating the time shift of each block according to aspects of the present disclosure.

FIG. 5 is a schematic diagram showing illustrative procedure for compensating the time shift of each block according to aspects of the present disclosure. Correlation with the reference is first computed to find the index $n_{j,b}$ at which $r_{j0,b}[m]$ is maximized over $-N_{ov}/2 \leq m \leq N_{ov}/2$. The block is then barrel shifted by $n_{j,b}$ samples.

If more accurate compensation is required, the ratios between the two neighboring samples with the peak sample can be computed, and a lookup table can be used to find the fractional shift $n_{j,b}'$. Fractional shifting of the block is achieved using an interpolation filter.

Reduced Complexity Implementation

Per the aforementioned description, the computationally expensive operations are: (a) correlating each block $|h_j(t_b)|^2$ with $|h_0(t_b)|^2$, and (b) shifting each $h_j(t_b)$ by $\tau_{j,b}$. In practice, these signals are sampled at a rate of $T_s=1/MB$ where M is the oversampling ratio relative to the chirp bandwidth B. Similar to digital coherent receivers for telecommunications, M=2 is often chosen as compromise. Note that $\tau_{j,b}$ does not have to be an integer multiple of $T_s$.

The digital correlation $r_{j0,b}[m] = \Sigma_{n \in n_b} |h_j[n-m]| |h_0[n]|^2$ is expected to be a sin $c^2(\cdot)$ function sampled at $T_s$. A computationally simple solution is to compute $r_{j0,b}[m]$ only for a range of indices $-N_{ov}/2 \leq m \leq N_{ov}/2$, where $N_{ov}=\lceil T_{ov}/T \rceil$ is the overlap duration in number of samples, and then find the index $n_{j,b}$ which maximizes $r_{j0,b}[m]$ over this range. The signals $h_j[n_b]$ are then barrel shifted by $n_{j,b}$ samples, which does not require any multiplications. This simplified implementation aligns all $h_j[n_b]$ to the nearest sample, ensuring the compensated signals have residual timing jitter of at most $\pm 0.5$ $T_s$.

Note that it is possible to reduce timing jitter further with an alternative implementation having slightly higher computational complexity. Since $r_{j0,b}[m]=\Sigma_{n\in n_b}|h_j[n-m]|^2$ $|h_0[n]|^2$ is a sampled sin $c^2(\cdot)$ function with the width between first nulls ±M samples apart, we can take the index $n_{j,b}$ which maximizes $r_{j0,b}[m]$, along with its two neighbors $n_{j,b}-1$ and $n_{j,b}+1$.

A lookup table indexed by the two ratios $r_{j0,b}[n_{j,b}-1]/r_{j0,b}[n_{j,b}]$ and $r_{j0,b}[n_{j,b}+1]/r_{j0,b}[n_{j,b}]$ quantized to a given timing jitter accuracy can then be used to find the fractional sample offset nib, where $$n_{j,b} + n'_{j,b} = \frac{\tau_{j,b}}{T_s}.$$

As with the previous case, $h_j[n_b]$ is first barrel-shifted by $n_{j,b}$ samples. To shift the remaining fractional sample $n_{j,b}'$, an interpolation filter $h_{int}[n]$ of $N_{int}$ taps can be used. The coefficients for $h_{int}[n]$ can once again be stored in a lookup table for different fractional offsets, quantized to a timing jitter accuracy required. This step is analogous to timing recovery in digital coherent receivers for telecommunications, where the received signal is digitally resampled using interpolation filters to keep the samples synchronized with the symbol clock. As $N_{int}$ can be small (e.g., 3 or 5 taps), resampling using interpolation filters can be of low complexity equal to $N_{int}$ complex multiplications per sample per polarization.

Example Experimental Results

We have produced experimental results demonstrating the operation of the frequency-drift compensation according to the present disclosure. The experimental setup is as shown in FIG. 2, where chirped pulses of duration $T_c$=50 μs and bandwidth B=10 MHz (spatial resolution $z_{res}$=c/2$n_{eff}$ B≈10 m), at a repetition rate of 1 kHz are generated using a digital-to-analog converter (DAC) which drives a Mach-Zehnder I/Q modulator.

The FUT comprises of a 50 km spool of standard single-mode fiber (SSMF), followed by a 12-m long piezo-electric transducer (PZT), whose output is terminated by a 100-m long fiber. The PZT is driven with a 67-Hz sine wave with peak-to-peak amplitude of 1.6 rad. It was observed that distortion caused by frequency drift is so severe that the resulting background noise level is larger than the vibration amplitude of the PZT To evaluate timing jitter associated with laser frequency drift, we evaluated over 200 traces of $|h_j(t)|^2$ recovered after correlating the received signal with the chirp. An exponential decay profile due to fiber attenuation, which has a round-trip loss of ≈0.4 dB/km was produced. As expected, there is negligible timing jitter between the beginning of the fiber, but timing jitter of around 1.5 μs peak-to-peak is observed at the end of the FUT, which corresponds to a frequency drift of ~300 kHz peak-to-peak.

With this jitter characterized, we used our inventive method to compensate frequency drift. Block sizes of $T_b$=25 μs and overlap duration of $T_{ov}$=2.5 μs were used. When we applied this technique to data as above, $|h_j(t)|^2$ near the end of the after timing-jitter compensation, the 200 traces become well aligned with each other.

When our technique is applied to performance of DAS using the "cheap/bad" laser previously described with frequency drift compensation, the 67-Hz vibration is now clearly observed and the phase spectrum has a noise floor corresponding to a strain sensitivity of 38 p$\varepsilon$/$\sqrt{Hz}$. Finally, the performance of DAS using a "good" laser that exhibits much less frequency drift than the "bad" laser produces a strain sensitivity at a position of the PZT also around 38 p$\varepsilon$/$\sqrt{Hz}$. Thus, frequency-drift compensation enables the cheaper "bad" laser with larger frequency drift to achieve comparable DAS performance as the expensive "good" laser At this point, while we have presented this disclosure using some specific examples, those skilled in the art will recognize that our teachings are not so limited. Accordingly, this disclosure should only be limited by the scope of the claims attached hereto.

The invention claimed is:

1. A method for frequency-drift compensation in a chirp-pulse-based distributed acoustic sensing system (DAS) comprising:
a length of optical fiber sensor cable;
a DAS interrogator in optical communication with the length of optical fiber sensor cable, the DAS interrogator including:
a seed laser; and
a coherent receiver;
the interrogator configured to:
produce probe signals including chirped pulses at a given frame rate, chirp duration and chirp slew rate and launching the probe signals into the length of optical fiber sensor cable; and
recover Rayleigh backscatter from the optical fiber sensor cable using the coherent receiver;
wherein the seed laser exhibits a non-negligible frequency drift such that a frequency of a local oscillator is different from a frequency which generated the chirped pulses resulting in timing jitter of a Rayleigh impulse response determined from a correlation of received backscatter with known chirp;
the method comprising:
compensating timing jitter in an estimated Rayleigh impulse response by
dividing each received frame of Rayleigh backscatter into overlapping blocks wherein the first frame received is a reference frame from which timing jitter of subsequent frames are estimated by correlating amplitude profiles of the subsequent frames with an amplitude profile of the reference frame and;
re-aligning the frames by the estimated jitter.

2. The method of claim 1 wherein a timing jitter of the reference frame is periodically updated to track a slowly changing channel.

3. The method of claim 2 wherein the timing jitter is estimated to an accuracy equal to an integer multiple of signal samples such that a time re-alignment corresponds to a barrel shift of the samples in a register.

4. The method of claim 3 wherein the timing jitter is estimated to an accuracy equal to a fraction of a signal sample.

5. The method of claim 4 wherein the fraction of the signal sample is obtained using a lookup table indexed by a ratio between a peak correlation value and correlation values of its neighbor peaks.

6. The method of claim 5 wherein resampling in time is performed by convolving each block of each frame of the Rayleigh impulse response by interpolation filter.

* * * * *